(12) United States Patent
Shmueli et al.

(10) Patent No.: US 10,047,864 B2
(45) Date of Patent: Aug. 14, 2018

(54) COMPRESSION RING FOR PISTONS

(71) Applicant: MAYMAAN RESEARCH, LLC, Hollywood, FL (US)

(72) Inventors: Eitan Shmueli, Davie, FL (US); Yehuda Shmueli, Davie, FL (US); Doron Shmueli, Hollywood, FL (US)

(73) Assignee: MAYMAAN RESEARCH, LLC, Hollywood, FL (US)

( * ) Notice: Subject to any disclaimer, the term of this patent is extended or adjusted under 35 U.S.C. 154(b) by 48 days.

(21) Appl. No.: 15/267,843

(22) Filed: Sep. 16, 2016

(65) Prior Publication Data

US 2018/0080555 A1 Mar. 22, 2018

(51) Int. Cl.
| F16J 9/12 | (2006.01) |
| F02F 3/00 | (2006.01) |
| F16J 9/02 | (2006.01) |
| F16J 9/20 | (2006.01) |
| F02F 1/00 | (2006.01) |

(52) U.S. Cl.
CPC ............... *F16J 9/12* (2013.01); *F02F 1/00* (2013.01); *F02F 3/00* (2013.01); *F16J 9/02* (2013.01); *F16J 9/20* (2013.01)

(58) Field of Classification Search
CPC ...... F16J 9/203; F16J 9/206; F16J 1/08; F16J 9/00; F16J 9/20; F16J 9/02; F16J 9/22
See application file for complete search history.

(56) References Cited

U.S. PATENT DOCUMENTS

| 1,651,721 A | 12/1927 | Lemery |
| 2,367,030 A | 1/1945 | Jessup |
| 3,237,953 A * | 3/1966 | Lucas ............... F16J 9/00 277/454 |
| 3,386,347 A * | 6/1968 | Bachle ............... F02B 75/044 123/48 B |
| 3,554,568 A | 1/1971 | Heid |
| 3,704,893 A | 12/1972 | Hill |
| 4,409,947 A | 10/1983 | Yanagihara et al. |
| 4,714,008 A * | 12/1987 | Bowers ............... F02F 3/0023 92/219 |
| 4,774,917 A * | 10/1988 | Tokoro ............... F02F 3/00 123/193.6 |

(Continued)

FOREIGN PATENT DOCUMENTS

| DE | 43 41 386 A1 | 6/1995 |
| GB | 587913 | 5/1947 |

OTHER PUBLICATIONS

International Search Report and Written Opinion, dated Nov. 20, 2017, for International Application No. PCT/US17/52064, 10 pages.

*Primary Examiner* — Long T Tran
(74) *Attorney, Agent, or Firm* — Seed IP Law Group LLP

(57) ABSTRACT

A piston ring having a ring-shaped body with at least one internal wall surface configured to bear against the piston, an exterior wall surface, and at least a top wall surface extending from the exterior wall surface to the at least one internal wall surface and capable of intersecting a top surface of the piston to form an extended top surface of the piston when mounted on the piston. The top wall surface of the ring cooperates with the piston top surface to form a reservoir that collects liquid scraped off the cylinder wall, thereby reducing or eliminating blow-by of contaminants to the crankcase.

10 Claims, 4 Drawing Sheets

(56) References Cited

U.S. PATENT DOCUMENTS

| | | | | |
|---|---|---|---|---|
| 4,955,353 A * | 9/1990 | Amataka | ............... | F02F 3/12 |
| | | | | 123/193.6 |
| 5,618,046 A * | 4/1997 | Binford | ............... | F16J 9/062 |
| | | | | 277/464 |
| 6,039,321 A * | 3/2000 | Jo | ............... | F16J 9/066 |
| | | | | 277/435 |
| 6,347,575 B1 * | 2/2002 | Booher | ............... | F16J 9/20 |
| | | | | 277/434 |
| 6,361,050 B1 * | 3/2002 | Sytsma | ............... | F16J 9/20 |
| | | | | 277/434 |
| 6,478,003 B2 * | 11/2002 | Laimbock | ............... | F02F 3/00 |
| | | | | 123/193.6 |
| 6,536,385 B1 * | 3/2003 | Takashima | ............... | F16J 9/20 |
| | | | | 123/73 C |
| 2002/0023609 A1 * | 2/2002 | Laimbock | ............... | F02F 3/00 |
| | | | | 123/193.6 |
| 2015/0337959 A1 * | 11/2015 | Schneider | ............... | F16J 9/12 |
| | | | | 123/193.4 |

* cited by examiner

COMPRESSION RING FOR PISTONS

BACKGROUND

Technical Field

The present disclosure pertains to internal combustion engines having a reciprocating piston slidably mounted within a cylinder and, more particularly, to a compression ring adapted to provide a seal between a top surface of the piston and a wall of the cylinder.

Description of the Related Art

Today's most common internal combustion engines are equipped with a cylinder, a piston slidably mounted in the cylinder, and a cylinder head mounted on the cylinder that in combination define a combustion chamber. Such engines are operated with a variety of fuels, including gasoline, diesel, biodiesel, hydrogen, ethanol alcohol (ethyl alcohol), propane, natural gas and others. In the past few years, new technologies have emerged, some in development and some already on the market, in which water, water injection, and other similar liquids are utilized.

In most internal combustion engines employing a piston-cylinder arrangement, the piston is slightly smaller in outside diameter than the inside diameter of the cylinder bore. At least one and usually three rings are used around the circumference of the piston to provide a seal between the piston and the wall of the cylinder. These rings are used in different configurations and are typically made from spring metal.

Most liquid type fuels are fed to the combustion chamber using a carburetor, port fuel injection or direct injection. The liquid fuel is converted to a mist or a spray during its transition to the combustion chamber. Once such spray touches a surface of the combustion chamber, it is turned back to a liquid. One such surface is the cylinder walls. This conversion back to liquid form inhibits complete consumption and burning of the fuel.

In current technologies during compression cycles the top ring is collecting liquid fuel from the cylinder walls, and it becomes trapped in the volume between the piston and cylinder. It is most critical during the compression stroke of a 4-stroke engine, where the pressure is high enough that once the piston reaches top dead center, the combustion creates maximum pressure to push the piston away from the cylinder head. This pressure pushes some of the liquid collected from between the piston and the cylinder wall past the piston and into the oil pan area. This is known as "blow-by." In a water-based fuel system and in hydrogen-based fuels where the by-product of the combustion is mostly water, such blow-by liquids are mixed with the engine oil residing in the oil pan below the piston.

Piston reciprocation occurs more than 1000 times per minute even at low rpm. In a multiple cylinder engine the amount of blow-by is substantial. The blow-by results in wasted fuel and contamination of the oil, creating a milky type substance that can cause rapid wear of internal parts of the engine and premature failure.

Although the space between the piston cylinder wall and top ring is very small, it can accumulate trapped liquid to a large volume very rapidly. Attempts have been made in the past, with some success, to reduce blow-by by using multiple rings in a variety of shapes and configurations on the piston. None, however, appear to have addressed eliminating or preventing the accumulation of liquid in this space between the piston cylinder wall and the top ring.

Shown in FIG. 1 is a cross-sectional view of an assembly 20 having a piston 22 slidably mounted within a cylinder 24 that is covered with a cylinder head 26 to define a combustion chamber 28. The piston 22 is mounted to a connecting rod 30 that in turn is coupled to a crankshaft 32, which is configured to move the piston 22 in a reciprocating fashion up and down in the cylinder 24. The construction and operation of the crankshaft 32 and connecting rod 30 will not be described in detail herein inasmuch as these are well-known elements to those of skill in the art. Similarly, the cylinder head 26 includes a pair of valves 34, a spark plug 36, and a fuel injector 38 that are in communication with the combustion chamber 28 in a well-known manner. These elements will also not be described in detail herein inasmuch as they form the environment within which the invention is designed to function, and such elements are well known to those of skill in the art.

Turning next to FIG. 2, shown therein in greater detail is a partial enlarged view of the assembly 20 of FIG. 1 showing a top ring 40 mounted within a channel 42 formed in a sidewall 44 of the piston 22. As is well known, the piston 22 has a cylindrical exterior sidewall surface 44 that is slightly smaller in diameter than an exterior sidewall surface 46 of the cylinder 24. The top ring 40, generally known as a compression ring, extends outward from the exterior sidewall surface 44 of the piston 22 to ride up against the interior cylinder wall 46 in a fashion that scrapes liquid 48 off the cylinder wall 46 and reduces blow-by from the combustion chamber 28 to a crankcase area around the connecting rod 30 and crankshaft 32 below the piston 22.

More particularly, during a typical four-stroke combustion cycle, fuel is injected into the combustion chamber 28 via the fuel injector 38. This fuel is shown as a spray 50 in FIG. 1. The spray of liquid fuel 50 can accumulate on the cylinder wall 46 in the form of droplets 48 shown in FIG. 2. During the movement of the piston 22 in a reciprocating fashion within the cylinder 24, the top ring 40 will scrape and collect the droplets 48 in the space 52 between the piston 22 and the cylinder 24. The liquid accumulates as indicated by reference number 54 within the space 52. Under the pressure of combustion, this trapped liquid 54 can blow past the top ring 40 and be injected into the crankcase containing the crankshaft 32, connecting rod 30, and lubricating oil.

Hence, there is a need to eliminate this trapped liquid 54 in the space 52 between the piston 22 and cylinder wall 24 to reduce the potential for damage to the engine, and to increase engine performance.

BRIEF SUMMARY

The present disclosure provides a piston ring design that minimizes or completely solves the foregoing problems by using a top ring that eliminates the trapped liquid in the space above the top ring and between the piston and cylinder wall.

In accordance with one aspect of the present disclosure, a piston ring is provided that includes a body having a ring shape with at least one internal wall surface configured to bear against the piston, an external wall surface, and at least a top wall surface extending from the exterior wall surface to the at least one internal wall surface and capable of intersecting a top surface of the piston to form an extended top surface of the piston when mounted on the piston. Ideally the top wall surface of the ring is slanted so as to form a reservoir with the piston top surface to collect the liquid scraped off the cylinder wall.

In accordance with another aspect of the present disclosure, an engine is provided. The engine includes a block having at least one cylinder in the block, the at least one cylinder having a sidewall, a piston slidably mounted in the at least one cylinder, the piston having a top surface and a substantially cylindrical exterior sidewall surface with at least one circumscribing groove formed in the exterior sidewall surface, and a piston ring that includes a body having a ring shape with at least one internal wall surface configured to reside in the groove of the piston, an external wall surface, and at least a top wall surface extending from the exterior wall surface to the at least one internal wall surface and capable of intersecting a top surface of the piston to form an extended top surface of the piston when mounted on the piston.

BRIEF DESCRIPTION OF THE SEVERAL VIEWS OF THE DRAWINGS

The foregoing features and advantages of the present disclosure will be more readily appreciated as the same become better understood from the following detailed description when taken in conjunction with the accompanying drawings, wherein.

DETAILED DESCRIPTION

Figures 1, 2:
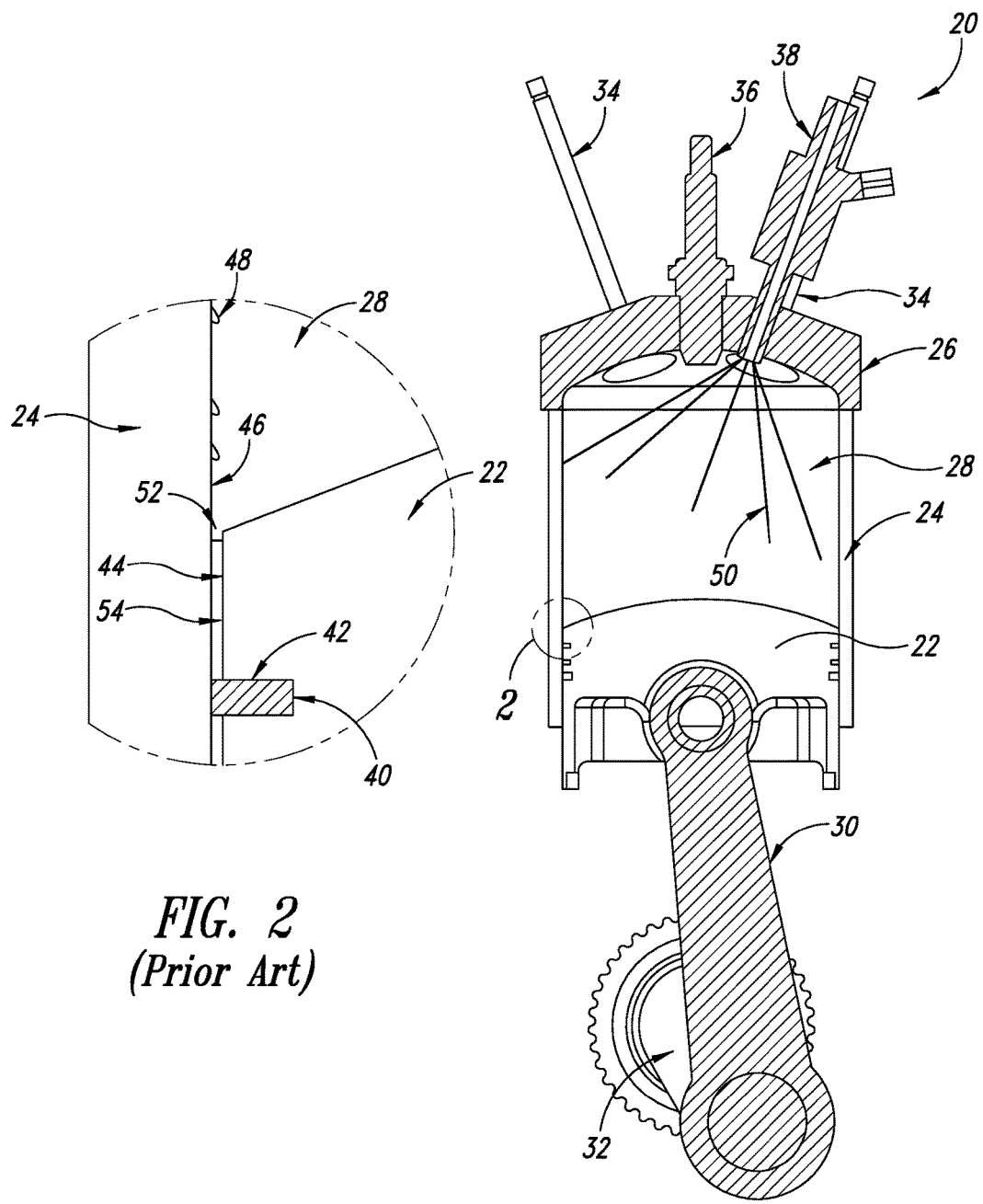
FIG. 1 illustrates a known piston, cylinder, and ring arrangement.
FIG. 2 is an enlarged cross-sectional view of a segment of the piston, cylinder, and ring arrangement of FIG. 1.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or components or both associated with internal combustion engines, fuels, oils, and related components including fuel pumps and injectors, crankshafts, and cylinder heads and valves have not been shown or described in order to avoid unnecessarily obscuring descriptions of the embodiments.

Unless the context requires otherwise, throughout the specification and claims that follow, the word "comprise" and variations thereof, such as "comprises" and "comprising," are to be construed in an open inclusive sense, that is, as "including, but not limited to." The foregoing applies equally to the words "including" and "having."

Reference throughout this description to "one embodiment" or "an embodiment" means that a particular feature, structure, or characteristic described in connection with the embodiment is included in at least one embodiment. Thus, the appearances of the phrases "in one embodiment" or "in an embodiment" in various places throughout the specification are not necessarily all referring to the same embodiment. Furthermore, the particular features, structures, or characteristics may be combined in any suitable manner in one or more embodiments.

In accordance with the present disclosure, a top ring is placed at the top of a piston where its unique shape is designed to collect most of the liquids from the cylinder wall. The ring is partially exposed to the combustion chamber to eliminate the space between the piston and the cylinder wall. The ring is configured to extend the area of the piston top and provide a reservoir to collect fuel scraped from the cylinder walls by the ring.

For example, a 2013 Ford focus engine is using a bore size of 88 mm, and the top manufacturer configuration ring is placed at 5 mm. Thus, the space between the piston and the cylinder is 0.025 mm below the top of the piston. The volume of the potential trapped liquid is calculated by the piston volume being subtracted from the cylinder volume using the height from the top of the top ring to the top of the piston: $(Pi \times CylinderR \times CylinderR \times Height) - (Pi - PistonR - PistonR - Height)$.

$$(Pi \times 44 \times 44 \times 5) - (Pi \times 43.925 \times 43.925 \times 5) = 30{,}395 - 30{,}291 = 103 \ (0.013 \ ML)$$

The calculation above shows the potential volume of liquid that can be trapped.

In a four-cylinder, four-stroke engine running at 2000 rpm, the potential rate of liquid penetration through the top ring is 13 ml per minute. In the design of the ring, piston and ring, and engine with piston and ring of the present disclosure, that potential volume is virtually zero.

In the present disclosure, the top ring or compression ring in one aspect has an angled top wall that is configured to remove and direct the fluid away from the cylinder wall and on to the top of the piston. In addition, combustion pressure will be used to push the ring to the wall of the cylinder during the power cycle to create a better ring-to-cylinder seal. This design also effectively enlarges the surface area of the piston top that is exposed to the combustion chamber, and it creates a reservoir for collected liquid as described in more detail below.

Figures 3, 4:
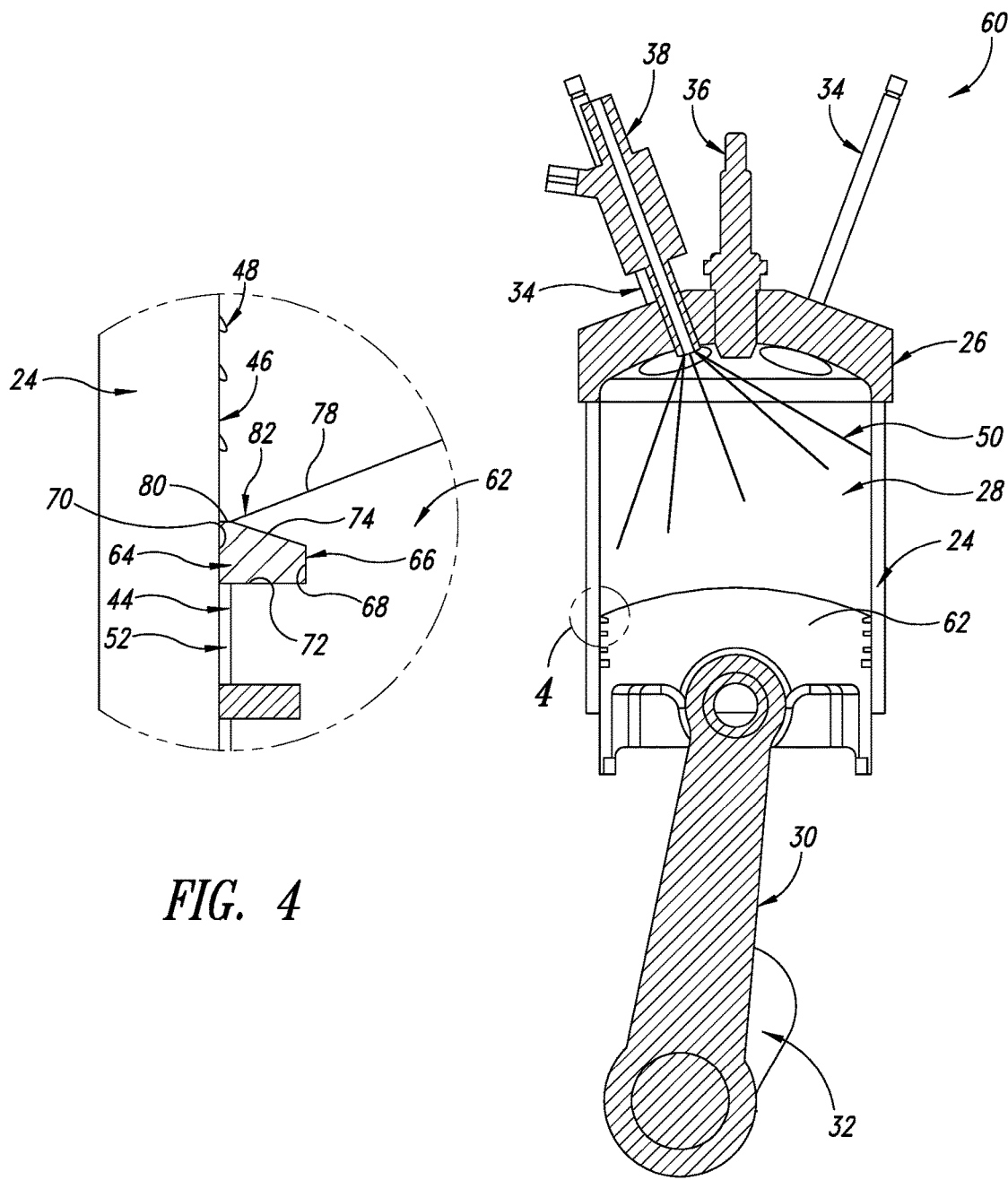
FIG. 3 illustrates an assembly of a piston mounted in a cylinder covered with a cylinder head and employing a ring formed in accordance with the present disclosure.
FIG. 4 is an enlarged partial view in cross-section of the assembly of FIG. 3 showing the relationship of the ring to the piston in accordance with the present disclosure.

Referring initially to FIGS. 3 and 4, shown therein is an assembly 60 formed in accordance with the present disclosure. Elements that are identical or similar to those of FIG. 1 bear the same reference numbers for the sake of convenience. Referring initially to FIG. 3, shown therein is a modified piston 62 having a modified top ring 64 mounted thereto. The piston has a cylindrical shape with a circumscribing exterior sidewall surface 44 with a channel 66 sized and shaped to receive the ring 64, as shown in more detail in FIG. 4. The ring 64 has a circular shape to match the size and shape of the piston 62 and is preferably formed of spring steel or other conventional material typically used for top rings or compression rings. The ring 64 has a break in it (not shown) that is conventionally used to enable the ring to be opened slightly and slid over the exterior of the piston 62 and positioned in place within the channel 66.

As shown in the cross-sectional view of FIG. 4, the top ring 64 has an interior wall 68 and a parallel exterior wall 70. The ring 64 also includes a bottom wall 72 and a top wall 74 that angles upward and away from the interior wall 68 to the exterior wall 70 so that the cross-sectional shape of the ring 64 is substantially trapezoidal.

The piston 62 has a piston top 78 that slopes downward towards the piston exterior sidewall 44. However, the ring 64 is mounted high enough on the piston exterior sidewall 64 that the piston top 78 intersects the top surface 74 of the ring 64 at an intersection point 80. As such, the intersection point 80 is the vertex of an inverted triangle that forms a reservoir 82 to collect the liquid 48. In this manner, the liquid pooled in the reservoir 82 is available for the next combustion cycle, so that any unburned remaining fuel within the reservoir 82 can be burned.

Figure 6:
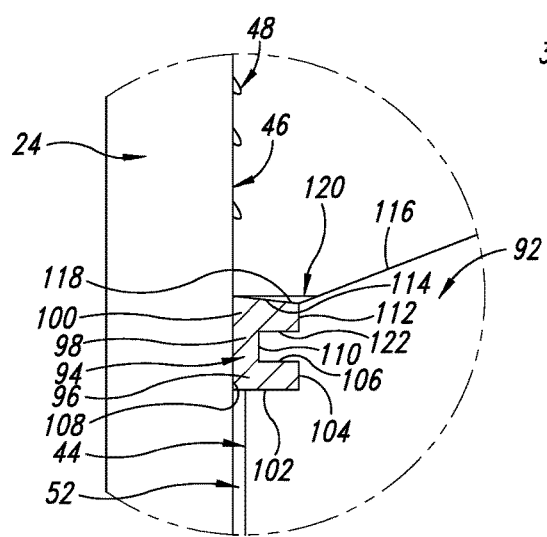
FIG. 6 is an enlarged partial view in cross-section of the assembly of FIG. 5 showing the relationship of the ring to the piston in accordance with the present disclosure.
Figure 5:
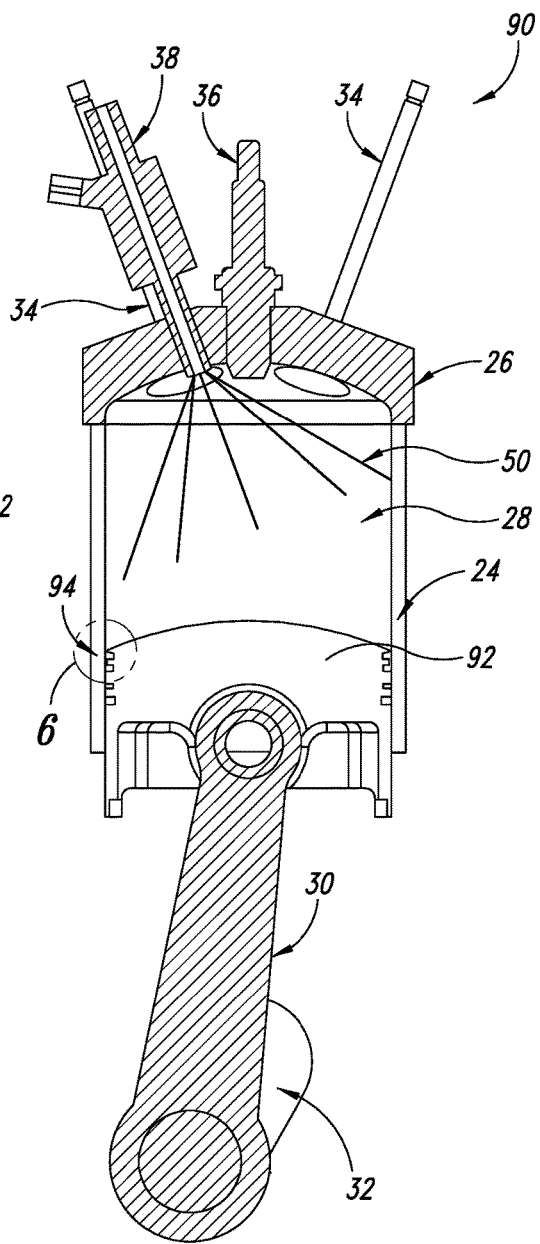
FIG. 5 is a cross-sectional view of an assembly having a piston in a cylinder covered with a cylinder head and a ring mounted on the piston in accordance with another aspect of the present disclosure.

Referring next to FIG. 5, shown therein is an alternative design in accordance with the present disclosure in which the assembly 90 includes components similar to those described above and, hence, bear the same reference number for the sake of convenience. In this design, the piston 92 has a ring 94 mounted thereon as shown in more detail in the enlarged view of FIG. 6. The ring 94 has a substantially U-shape formed by a rectangular bottom section 96, a U-shaped center section 98, and a trapezoidal top section 100. The bottom section 96 has a bottom wall 102, a first interior wall 104 at substantially a right angle to the bottom wall 102, and an intermediate top wall 106. The bottom section 96 includes an exterior wall 108 that is at substantially a right angle to the bottom wall 102 and parallel to the lower first interior wall 104. The center section 98 has a second interior wall 110 that is offset from the lower first interior wall 104 but parallel thereto. The second interior wall 110 is parallel to the exterior wall 108 as well. The trapezoidal top section 100 has a third interior wall 112 that is substantially parallel to and coplanar with the first interior wall 104. It is also parallel to the exterior wall 108 that is common to the three sections 96, 98, 100. The trapezoidal top section 100 includes a top wall 114 that intersects with and extends upward and away from the third interior wall 112 to intersect the exterior wall 108 and thereby form the trapezoidal shape. The top wall 114 intersects not only the third interior wall 112 but also the piston top 116 at a common vertex 118 to form a reservoir 120 to collect liquid 48 therein.

It will be appreciated that the piston 92 has its top 116 and exterior sidewall 44 formed to be sized and shaped to receive the ring 94 so that the surfaces are substantially mating, i.e., the first, second, and third interior walls 104, 110, and 112, as well as the lower top wall 106 of the bottom section 96 and a corresponding parallel second lower wall 122 of the trapezoidal top section 100.

Figure 8:
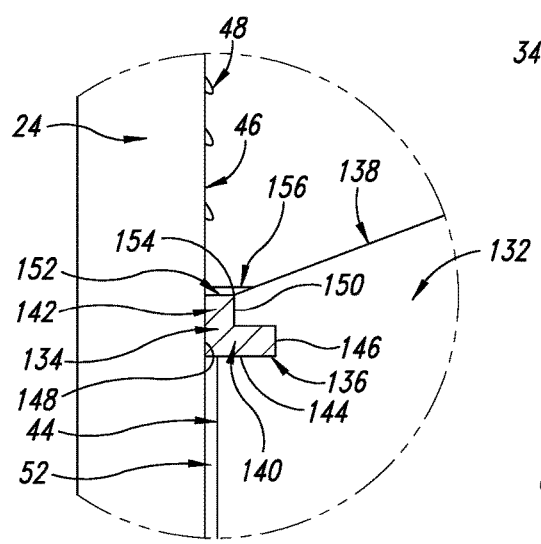
FIG. 8 is an enlarged partial view of the assembly of FIG. 7 showing the relationship in cross-section of the ring to the piston in accordance with this aspect of the present disclosure.
Figure 7:
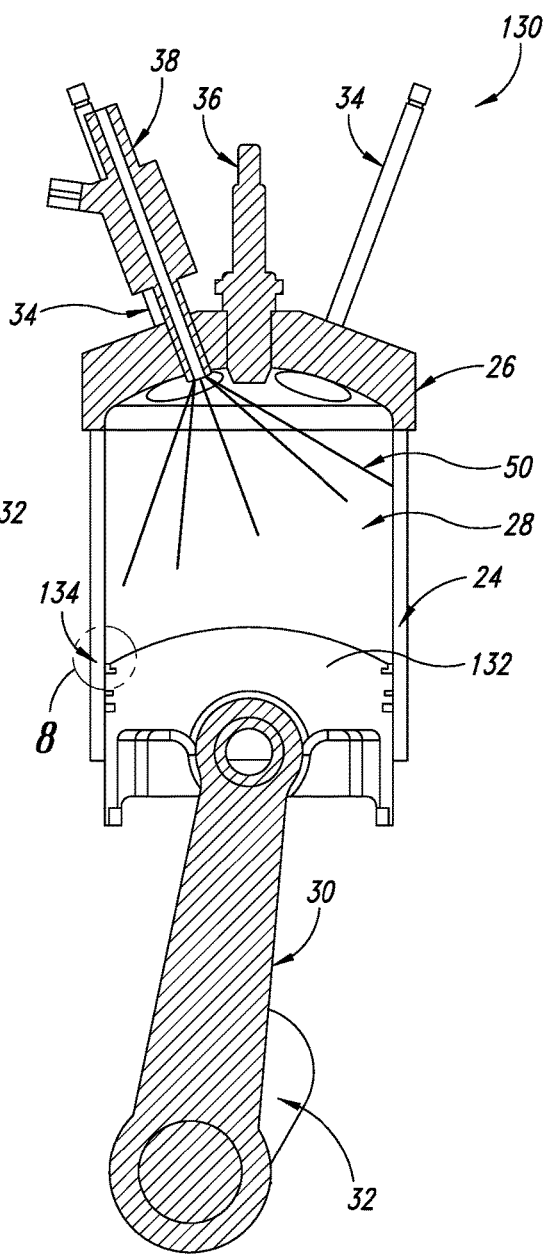
FIG. 7 is a cross-sectional view of an assembly that includes a piston in a cylinder covered with a cylinder head and having a ring mounted on the piston in accordance with another aspect of the present disclosure.

Finally, FIGS. 7 and 8 show another aspect of the present disclosure in which the assembly 130 utilizes components similar to those in the previous description and, hence, bear the same reference number. However, in this aspect of the present disclosure, the piston 132 is configured to receive a top ring 134 that has a unique configuration, which is shown in more detail in FIG. 8. The ring 134 is formed to be seated within a matching groove 136 in the piston sidewall 44 and in which a portion of the piston top 138 is also removed to accommodate the ring 134. More particularly, the ring 134 has an L-shape with a lower rectangular section 140 and an upper rectangular section 142 orthogonal to the lower rectangular section 140. The lower section 140 has a bottom wall 144 and an interior sidewall 146 that is at substantially a right angle to the bottom wall 144. The interior sidewall 146 is shorter than but parallel to a corresponding exterior wall 148. An upper interior wall 150 is parallel to the lower interior wall 146 and offset closer to the exterior wall 148. The top section 142 includes not only the offset upper interior wall 150 but also a top wall 152 that is substantially parallel to the bottom wall 144 and at a right angle to the exterior wall 148. The upper wall 152 is sized to intersect both the upper interior wall 150 and the piston top 138 at a common vertex or intersection point 154. The top wall 152 and the piston top 138 cooperate to form a reservoir 156 to collect fluid 148 from the cylinder wall 46. In this manner, the fluid 48 does not become entrapped in the space 52 between the piston 132 and the cylinder wall 24.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A piston ring for a piston, comprising:
a body having a ring shape with an internal wall surface to bear against the piston, an exterior wall surface, and a top wall surface extending from the exterior wall surface the internal wall surface and intersecting with a top surface of the piston to form an extended top surface of the piston when mounted on the piston, the top wall surface angled to slope away from the exterior wall surface and downward towards the internal wall surface its entire length.

2. The piston ring of claim 1 wherein the exterior wall surface is parallel to the interior wall surface and the top wall angles upward and away from the interior wall surface to the exterior wall surface so that a cross-sectional shape of the ring is trapezoidal.

3. The piston ring of claim 1 wherein the top wall of the piston ring cooperates with the top surface of the piston to form a reservoir to collect liquid.

4. The piston ring of claim 1 wherein the body has a U-shape formed by a rectangular bottom section, a U-shaped center section, and a trapezoidal top section, the bottom section has a bottom wall, the exterior wall surface at a right angle to the bottom wall, an intermediate top wall, and an interior wall that is at a right angle to the bottom wall and parallel to the exterior wall surface, the center section having an interior wall that is offset from and parallel to the exterior wall surface, the trapezoidal top section having an interior wall, a lower wall, and a top wall that intersects with and extends upward and away from the interior wall to the exterior wall surface and thereby form the trapezoidal shape, the top wall sized and shaped to intersect the piston top at a vertex when installed on the piston to form a reservoir to collect liquid therein.

5. The piston ring of claim 1 wherein the body has an L-shape with a lower rectangular section and an upper rectangular section orthogonal to the lower rectangular section, the lower rectangular section has a bottom wall and an interior sidewall that is at a right angle to the bottom wall, the interior sidewall having a length that is shorter than and parallel to a corresponding exterior wall, the upper rectangular section having an upper interior wall that is parallel to the lower interior wall and offset closer to the exterior wall, a top wall that is parallel to the bottom wall and at a right angle to the exterior wall, the upper wall sized to intersect both the upper interior wall and the piston top at a vertex when the piston ring is installed on the piston to form a reservoir to collect fluid.

6. An engine, comprising:
- a block having at least one cylinder in the block, the at least one cylinder having a sidewall;
- a piston slidably mounted in the at least one cylinder, the piston having a top surface and a cylindrical exterior sidewall surface with at least one circumscribing groove formed in the exterior sidewall surface; and
- a body having a ring shape with an internal wall surface to bear against the piston, an exterior wall surface, and a top wall surface extending from the exterior wall surface the internal wall surface and intersecting with a top surface of the piston to form an extended top surface of the piston when mounted on the piston, the top wall surface is angled to slope away from the exterior wall surface and downward towards the internal wall surface.

7. The engine of claim 6 wherein the exterior wall surface is parallel to the interior wall surface and the top wall angles upward and away from the interior wall surface to the exterior wall surface so that a cross-sectional shape of the ring is trapezoidal.

8. The engine of claim 6 wherein the top wall of the piston ring cooperates with the top surface of the piston to form a reservoir to collect liquid.

9. The engine of claim 6 wherein the body has a U-shape formed by a rectangular bottom section, a U-shaped center section, and a trapezoidal top section, the bottom section has a bottom wall, the exterior wall surface at a right angle to the bottom wall, an intermediate top wall, and an interior wall that is at a right angle to the bottom wall and parallel to the exterior wall surface, the center section having an interior wall that is offset from and parallel to the exterior wall surface, the trapezoidal top section having an interior wall, a lower wall, and a top wall that intersects with and extends upward and away from the interior wall to the exterior wall surface and thereby form the trapezoidal shape, the top wall sized and shaped to intersect the piston top at a vertex when installed on the piston to form a reservoir to collect liquid therein.

10. The engine of claim 6 wherein the body has an L-shape with a lower rectangular section and an upper rectangular section orthogonal to the lower rectangular section, the lower rectangular section has a bottom wall and an interior sidewall that is at a right angle to the bottom wall, the interior sidewall having a length that is shorter than and parallel to a corresponding exterior wall, the upper rectangular section having an upper interior wall that is parallel to the lower interior wall and offset closer to the exterior wall, a top wall that is parallel to the bottom wall and at a right angle to the exterior wall, the upper wall sized to intersect both the upper interior wall and the piston top at a vertex when the piston ring is installed on the piston to form a reservoir to collect fluid.

* * * * *